US005812852A

United States Patent [19]
Poulsen et al.

[11] Patent Number: 5,812,852
[45] Date of Patent: Sep. 22, 1998

[54] SOFTWARE IMPLEMENTED METHOD FOR THREAD-PRIVATIZING USER-SPECIFIED GLOBAL STORAGE OBJECTS IN PARALLEL COMPUTER PROGRAMS VIA PROGRAM TRANSFORMATION

[75] Inventors: David K. Poulsen, Urbana; Paul M. Petersen; Sanjiv M. Shah, both of Champaign, all of Ill.

[73] Assignee: Kuck & Associates, Inc., Champaign, Ill.

[21] Appl. No.: 749,038

[22] Filed: Nov. 14, 1996

[51] Int. Cl.⁶ .................................. G06F 9/45; G06F 7/00
[52] U.S. Cl. ........................ 395/706; 395/705; 395/707; 395/709; 395/500; 395/685; 395/800.1; 395/800.28
[58] Field of Search ...................................... 395/705–707, 395/709, 500, 800, 685

[56] References Cited

U.S. PATENT DOCUMENTS

| | | | |
|---|---|---|---|
| 5,088,034 | 2/1992 | Ihara et al. ................................. | 395/706 |
| 5,093,916 | 3/1992 | Karp et al. ................................. | 395/685 |
| 5,278,986 | 1/1994 | Jourdenais et al. ....................... | 395/706 |
| 5,381,550 | 1/1995 | Jourdenais et al. ....................... | 395/706 |
| 5,721,928 | 2/1998 | Umehara et al. ......................... | 395/706 |

OTHER PUBLICATIONS

"Compiler Support For Privatization ON Distributed–Memory Machines" By Palermo et al., Proceedings of the 1996 International Conference on Parallel Processing, vol. 3, pp. 17–24, 1996.

Padue, D.A., and Wolfe, M.J., "Advanced Compiler Optimizations for Supercomputers." Communications of the ACM, vol. 29, No. 12 (Dec. 1986), pp. 1148–1201.

Eigenmann, R., and Blume, W., "An Effectiveness Study of Parallelizing Compiler Techniques." Proceedings of the 1991 International Conference on Parallel Processing (Aug. 1991), pp. II–17–25.

Tu, P., and Padua, D., "Automatic Array Privatization." Proceedings of the Sixth Workshop on Languages and Compilers for Parallel Computing, U. Banerjee, D. Gelernter, A Nicolau, and D. Padua, eds., Portland, OR, Lecture Notes in Computer Science, vol. 768 (Aug. 12–14, 1993), pp. 500–521.

CF77 Commands and Directives, Document Number SR–37716.0. Mendota Heights, MN, City Research, Inc. 1993. p. 135.

Fortran 77 Programmer's Guide, Document Number 007–0711–050. Mountain View, CA, Silicon Graphics, Inc. Aug. 1993. p. 56.

(List continued on next page.)

*Primary Examiner*—Emanuel Todd Voeltz
*Assistant Examiner*—Than Q. Dam
*Attorney, Agent, or Firm*—Brinks Hofer Gilson & Lione

[57] ABSTRACT

A software-implemented method for dynamically and statically privatizing global storage objects in parallel computer programs written in various programming languages. Privatization is accomplished via transformation of these parallel computer programs under the control of a general purpose computer. The privatization method is system-independent and is portable across various computer architectures and platforms since privatization is accomplished via program transformation; thus, the method does not depend on the features of a particular hardware architecture or configuration, operating system, compiler, linker, or thread environment. The inputs to the method are a parallel computer program, comprising parallel regions of execution and global storage objects, and a privatization specification describing the global storage objects to be privatized and the particular parallel regions, and manner, in which each of these objects is to be privatized. The privatization method itself translates the input parallel computer program into a second parallel computer program, according to the privatization specification, such that the second parallel computer program, when executed, accesses the specified global storage objects in a privatized manner, without requiring any explicit programmer modifications to the input parallel computer program.

12 Claims, 9 Drawing Sheets

OTHER PUBLICATIONS

LD(1) man page, Release 1.2. Mountain View, CA, Silicon Graphics, Inc. 1994. p. 13.

prctl (2) man page, Release 5.2. Mountain View, CA, Silicon Graphics, Inc. 1994. pp. 1–2.

ANSI X3H5 subcommittee, "X3H5 Parallel Extension for Fortran." pp. 10, 22–24, 29, 54–56.

Parallel Computing Forum, "The Parallel Computing Forum presents: PCF Fortran." B. Leisure, ed. (Aug. 1, 1990), pp. 45–50.

Eigenmann, R. et al., "Restructing Fortran Programs for Cedar." Proceedings of the 1991 International Conference on Parallel Processing (Aug. 1991), pp. I–57–66.

Guzzi, M.D. et al., "Cedar Fortran and Other Vector and Parallel Fortran Dialects." Journal of Supercomputing, vol. 4, No. 1 (Mar. 1990), pp. 37–62.

Toomey, L.J. et al., "IBM Parallel Fortran." IBM Systems Journal, vol. 27, No. 4 (1988), pp. 416–435.

KSR Fortran Programming Manual. Waltham, MA Kendall Square Research. Dec. 1993. pp. 6–31.

Guide to DECthreads. Maynard, MA, Digital Equipment Corp., Jul. 1994. pp. pthread–74–75, 113–114.

Pfister, G.F. et al. "The IBM Research Parallel Processor Prototype (RP3): Introduction and Architecture." Proceedings of the 1985 International Conference on Parallel Processing (Aug. 1985), pp. 764–771.

Konicek, J. et al., "The Organization of the Cedar System." Proceedings of the 1991 International Conference on Parallel Processing (Aug. 1991), p. I–49–56.

Hwang, K., and Briggs, F. A., Computer Architecture and Parallel Processing. New York, McGraw–Hill, 1984. pp. 264–271, 714–717.

VAX Fortran Language Reference Manual, Order No. AA–D034E–TE. Maynard, MA, Digital Equipment Corp. Jun. 1988. pp. 4–29–41.

CF77 Fortran Language Reference Manual, Document No. SR–37726.0. Mendota Heights, MN Cray Research, Inc. 1993. p. 76–81, 136, 292.

Guide Reference Manual, Version 2.1, Document No. 9607001. Champaign, IL, Kuck and Associates, Inc. Sep. 1996, pp. 5–22.

FIG.8A

```
        real a,b
        common /tc/a,b
C$PAR INSTANCE TASK /tc/
        . . .
C$PAR PARALLEL
        . . .
        a = a + b
        . . .
C$PAR END PARALLEL
```

FIG.8B

```
        structure /s_tc/
            real a,b
        end structure
        record /s_tc/ r_tc
        pointer (p_tc,r_tc)
        real a,b
        common /tc/a,b
        . . .
C$PAR PARALLEL
        call initialize
        p_tc=setup(a,16"C$PAR INSTANCE TASK","SETUP")
        . . .
        r_tc.a=r_tc.a + r_tc.b
        . . .
C$PAR END PARALLEL
```

FIG.9A

```
real a(100),b(100),c,d,e(100),f(2)
common/tc/a,b,c,d
C$PAR INSTANCE TASK/tc/
    equivalence(a(51),e)
    equivalence(b(100),f)
    . . .
C$PAR PARALLEL
    . . .
    a(1)=b(2)+e(3)
    . . .
C$PAR END PARALLEL
```

FIG.9B

```
structure/s_tc/
    union
        map
            real a(100)
            real b(100)
            real c
            real d
        end map
        map
            real %fill(50)
            real e(100)
        end map
        map
            real%fill(99)
            real f(2)
        end map
    end union
end structure
record /s_tc/r_tc
pointer(p_tc,r_tc)
real a(100),b(100),c,d
common/tc/a,b,c,d
. . .
C$PAR PARALLEL
    call initialize
    p_tc=setup(a,1616,"C$PAR INSTANCE TASK","SETUP")
    . . .
    r_tc.a(1) = r_tc.b(2)+r_tc.e(3)
C$PAR END PARALLEL
```

FIG. 10A

```
      integer i
      common /tc/i
C$PAR INSTANCE TASK/tc/
          . . .
C$PAR PARALLEL
          . . .
          do i = 1, n
          end do
          . . .
C$PAR END PARALLEL
```

FIG. 10B

```
      structure /s_tc/
          integer i
      end structure
      record /s_tc/r_tc
      pointer(p_tc,r_tc)
      integer i
      common /tc/i
          . . .
C$PAR PARALLEL
      call initialize
      p_tc=setup(i,4,"C$PAR INSTANCE TASK","SETUP")
          . . .
          do iltmp = 1,n
              r_tc.i = iltmp
              . . .
          end do
          . . .
C$PAR END PARALLEL
```

SOFTWARE IMPLEMENTED METHOD FOR THREAD-PRIVATIZING USER-SPECIFIED GLOBAL STORAGE OBJECTS IN PARALLEL COMPUTER PROGRAMS VIA PROGRAM TRANSFORMATION

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

MICROFICHE APPENDIX

A Microfiche Appendix of the presently preferred computer program source code is included and comprises two sheets of fiche, having a total of 107 frames. The Microfiche Appendix is hereby expressly incorporated herein by reference, and contains material which is subject to copyright protection as set forth above.

BACKGROUND OF THE INVENTION

1. Field of Invention The present invention relates to computer systems and to parallel computer programming, and, more particularly, to methods for privatizing global storage objects in parallel computer programs to provide per-thread private copies of these global objects when executing parallel computer programs.

Privatization is an established, important technique for parallelizing computer programs and for enhancing the parallelism and performance of parallel computer programs. Privatization refers to the process of partitioning storage objects in a global memory address space among multiple processors or threads of execution. Whereas a global storage object, in a global memory address space, is accessible to multiple processors or threads, an access to a privatized global storage object, by a particular processor or thread, results in accessing one of multiple, local copies of the global object. Each of these local copies of the global object is private and unique to a particular processor or thread. The parallelism-enhancing effects of privatization include eliminating memory access conflicts (formally referred to as data dependences), partitioning storage and thereby partitioning parallel tasks, and increasing memory reference locality.

The concepts of global and local storage objects are found in many common programming languages. Global storage objects are addressable across multiple procedures and threads; examples include simple (scalar) global variables and compound (aggregate) global objects such as structs, unions, and classes in C and C++, and COMMON blocks and STRUCTUREs in Fortran. Many programming language implementations implicitly support thread-private storage through their support for re-entrant procedures and multithreading. In such language implementations, all procedure parameters and local variables are implicitly private since they are stack-allocated, and since stacks are allocated privately for each of multiple threads.

To facilitate parallel programming, many implementations of privatization allow the programmer to specify that a global storage object is to be privatized, without requiring that the programmer make any changes in the way that the object is declared or addressed in a parallel program. In such an implementation, when a particular global storage object is privatized, references to that object that appear to reference the global object actually reference the privatized copies of the object instead. In these schemes, privatization can either be static or dynamic for a given global storage object. In static privatization, an object is privatized in all of the parallel regions of execution in a parallel program. In dynamic privatization, an object may be accessed globally in some parallel regions but privatized in others. Examples of static mechanisms include the Cray TASK COMMON directive, the Silicon Graphics, Inc. (SGI)-Xlocaldata mechanism, the ANSI X3H5 draft PRIVATE clause, the Parallel Computing Forum (PCF) PRIVATE declaration, and the Cedar Fortran CLUSTER and task COMMON declarations. Examples of dynamic mechanisms include the ANSI X3H5 draft INSTANCE PARALLEL directive, the PCF SCOMMON declaration, privatizable COMMON blocks in IBM Parallel Fortran, and the Kendall Square Research (KSR) "partially shared COMMON" declaration. When using any of these static or dynamic mechanisms, privatization is accomplished without modifying any references to the global storage objects to be privatized.

2. Prior Art

Privatization has been implemented via a number of widely-varying mechanisms. Privatization can be implemented by explicitly modifying the scope of, and references to, objects to be privatized. In languages that support thread-private local variables, objects can be privatized by localizing them, for example, by making them local variables or by using mechanisms such as the ANSI X3H5 draft PRIVATE clause. Another way to localize storage for objects to be privatized is to use mechanisms such as thread-local storage in POSIX 1003.4a pthreads (i.e., pthread_setspecific, pthread_getspecific). Privatized access to these localized objects can then be provided by passing the localized objects down through procedure call chains. A significant disadvantage of this approach is that it requires that references, and procedure headers and call sites, be modified. These modifications can require interprocedural or whole-program analysis to correctly process the call chains.

Privatization can also be implemented via explicit expansion of objects (i.e., scalar or array expansion). This approach, however, has disadvantages similar to those of the preceding method. The references and declarations of the global objects to be privatized must be modified to perform the expansion. A further disadvantage of explicit expansion is that declarations must be expanded by the number of threads, so that each thread can access privatized storage by indexing into expanded objects. Determining a suitable upper bound on the number of threads may be problematic, and poor storage utilization results when this upper bound exceeds the number of threads actually used.

The preceding two types of explicit privatization methods have difficulty in handling one particularly important language feature, COMMON blocks, in a widely-used programming language, Fortran. A Fortran COMMON block is a compound global storage object, comprising one or more member variables, that cannot be addressed by name within a Fortran program. Thus, any explicit privatization method must privatize each member of a COMMON block separately. Privatization of individual COMMON members has a significant disadvantage, however, in that the relationships that hold between members of a global COMMON block may not hold between the members of a privatized copy of that COMMON block. The preservation of these relationships is important in that it allows common programming techniques such as aliasing, equivalencing, out-of-bounds addressing, and pointer indexing between COMMON members to be used. One way to work around this problem is to encapsulate the members of a COMMON block in a compound object (e.g., a structure) and then to privatize the compound object; however, this requires further reference modifications to address the privatized members contained within the compound object. Explicit privatization of Fortran COMMON blocks is further complicated by the fact that COMMON blocks may be declared with different sizes and member layouts in different procedures. Varying sizes or layouts introduce implicit aliasing between members in the varying representations of a COMMON block that will not be preserved if individual COMMON block members are separately privatized. Furthermore, explicit expansion of (encapsulated) COMMON blocks is difficult when sizes vary.

Most of the relevant privatization schemes in the prior art allow the privatization of global storage objects without requiring parameter passing or reference modification by the programmer. The implementations of these schemes, however, rely on specific support from system hardware, software, or operating systems, thus making these schemes impossible to implement on some particular computer systems and non-portable across multiple systems.

Privatization of global storage objects can be implemented via a hardware partitioning of a computer system's physical address space into shared and private regions. Accesses by any processor to an address in a shared region then access a single, shared copy of the data stored at that address, whereas accesses to an address in a private region access private, per-processor copies of data, even though different processors access that data via the same address.

Examples of systems providing hardware support for privatization include the IBM Research Parallel Processing Prototype (RP3), the Cedar multiprocessor developed at the University of Illinois, Center for Supercomputing Research and Development (CSRD), and the Cray X-MP/Y-MP parallel-vector supercomputers. The RP3 machine consists of multiple processor/memory nodes connected via an interconnection network. The memory in each node is dynamically partitionable into global, network-accessible segments and node-private segments. The Cedar machine consists of multiple clusters connected via a network to a system-wide global memory, where each cluster consists of multiple processors and a cluster-wide memory. Each cluster-wide memory is private to the processors in a particular cluster. Per-processor, stack-allocated private memory is also provided. Cray parallel-vector supercomputers provide register banks and/or memory areas that can be accessed privately by individual processors.

In addition to the limitation of being hardware-specific, privatization schemes based on hardware partitioning suffer either from limits on the size of private storage areas, from difficulties in efficiently utilizing fixed-size global and private storage areas, or from difficulties in managing the ownership of various storage areas in a multiprocessing or multiprogramming environment.

Privatization of global storage objects can also be implemented through the use of the operating system and the hardware's memory management unit (MMU). In this method, page tables are set up for each processor that logically partition its virtual address space into shared and private regions. The real addresses corresponding to virtual addresses in shared regions map to real, shared pages in memory. The real addresses corresponding to virtual addresses in private regions map to pages in real memory that are allocated for the private use of individual processors. Here, different processors can access private copies of data in private pages even though different processors access these data through the same virtual address. MMU-based schemes suffer the disadvantage of requiring specific support from the hardware and operating system in order to utilize the MMU.

The SGI-Xlocaldata mechanism is a notable example of an MMU-based privatization scheme. This mechanism, provided on systems running the Irix operating system, allows the static privatization of global storage objects in a program by specifying them using the linker-Xlocaldata switch. The specified objects are placed in a "local bss" segment in the program's address space. Private memory is allocated in each thread for the local bss segment, and the MMU is used to map the original (shared) virtual addresses of the objects to be privatized to the thread-private memory areas (by using the PR_ATTACHADDR option to the prctl system call). In this way, the existing references to the global objects automatically reference the thread-private memory areas. A particular disadvantage of the SGI scheme is the linker support required, and the fact that the programmer must specify the objects to be privatized to the linker, rather than to the compiler or in the program itself.

The AIX operating system for IBM RS/6000 computers provides an address translation mechanism that can be used, similarly to an MMU, to implement privatization. Under AIX, all globally addressable memory is accessed through a "table of contents"(TOC). The base address of the TOC is stored in a reserved processor register; any access to a global variable first loads the base address of the variable from the TOC and then accesses the variable via this base address. Using a separate, private TOC for each thread can then facilitate the implementation of a privatization scheme. A disadvantage of this approach is that it requires very system-specific support from, and coordination between, system tools including compilers, assemblers, linkers, and debuggers.

Privatization schemes based on hardware partitioning or MMU support both rely on the availability of special services either from the hardware, from the operating system, or from other system tools such as compilers or linkers. When these services are not available in a particular hardware or software environment, it is impossible to implement privatization using these schemes in that environment. Furthermore, the lack of these services, or the lack of consistent interfaces to these services across different computer systems, makes the above methods inherently non-portable among these various environments.

SUMMARY OF THE INVENTION

The present invention is a software-implemented method for dynamically and statically privatizing global storage objects in parallel computer programs written in various programming languages. Privatization is accomplished via transformation of these parallel computer programs under computer control, resulting in a privatization method that is system-independent, is portable across various computer architectures and platforms, and requires no reference modification or parameter passing on the part of the programmer.

The inputs to the privatization method are a parallel computer program, comprising parallel regions and global storage objects, and a privatization specification describing the global storage objects to be privatized and the particular parallel regions, and manner, in which each of these objects is to be privatized. The privatization method itself translates the input parallel computer program into a second parallel computer program, according to the privatization specification, such that the second parallel computer program, when executed, accesses the specified global storage objects in a privatized manner, without requiring any user modifications to the input parallel computer program.

In the preferred embodiment of the present invention, the privatization method is implemented by performing a program transformation, under computer control, for each global storage object to be privatized; this program transformation comprises three steps. First, a compound object (e.g., a structure) is declared that encapsulates the object to be privatized, and a pointer variable is declared that can point to this new compound object. Next, the references to the object to be privatized are translated into references to the new compound object. Finally, a library call is inserted that, when executed, instantiates and initializes the appropriate thread-private memory for the compound object, according to either static or dynamic privatization semantics, and initializes the pointer variable to point to this thread-private memory.

Accordingly, several objects and advantages of the present invention are as follows:

1. to provide a means for privatizing global storage objects in parallel computer programs that is portable across various types of computer systems;
2. to provide a portable privatization means by using a software method that is independent of attributes of particular computer systems, including, but not limited to, hardware architecture or configuration, operating system, compiler, linker, or thread environment;
3. to provide a privatization means that is independent of the particular number, or range of numbers, of threads used to execute parallel computer programs;
4. to provide a privatization means that is independent of the particular parallel programming language used, for languages that provide for common features such as global and local storage objects, acquisition and storage of pointers to objects, and compound objects;
5. to provide for the privatization of global storage objects, according to input privatization specifications, without requiring that input parallel programs be modified to change the way that these global storage objects are addressed;
6. to provide a single software privatization means having the ability to privatize various global storage objects either statically or dynamically in a particular parallel computer program;
7. to provide for the privatization of global storage objects while preserving the relationships that hold between the members of compound global storage objects, in each privatized copy of said objects, thereby preserving the functionality of programming techniques that are commonly used in conjunction with compound storage objects, including, but not limited to, aliasing or equivalencing between members, out-of-bounds addressing from one member to surrounding members, or pointer dereferencing or indexing among members;
8. to provide a privatization means having the ability to privatize both simple and compound global storage objects; and
9. to provide a privatization means that supports separate compilation of the various procedures of parallel programs.

These and further objects and advantages of the present invention will become apparent from a consideration of the subsequent description and accompanying drawings.

DRAWING FIGURES

Figure 2:
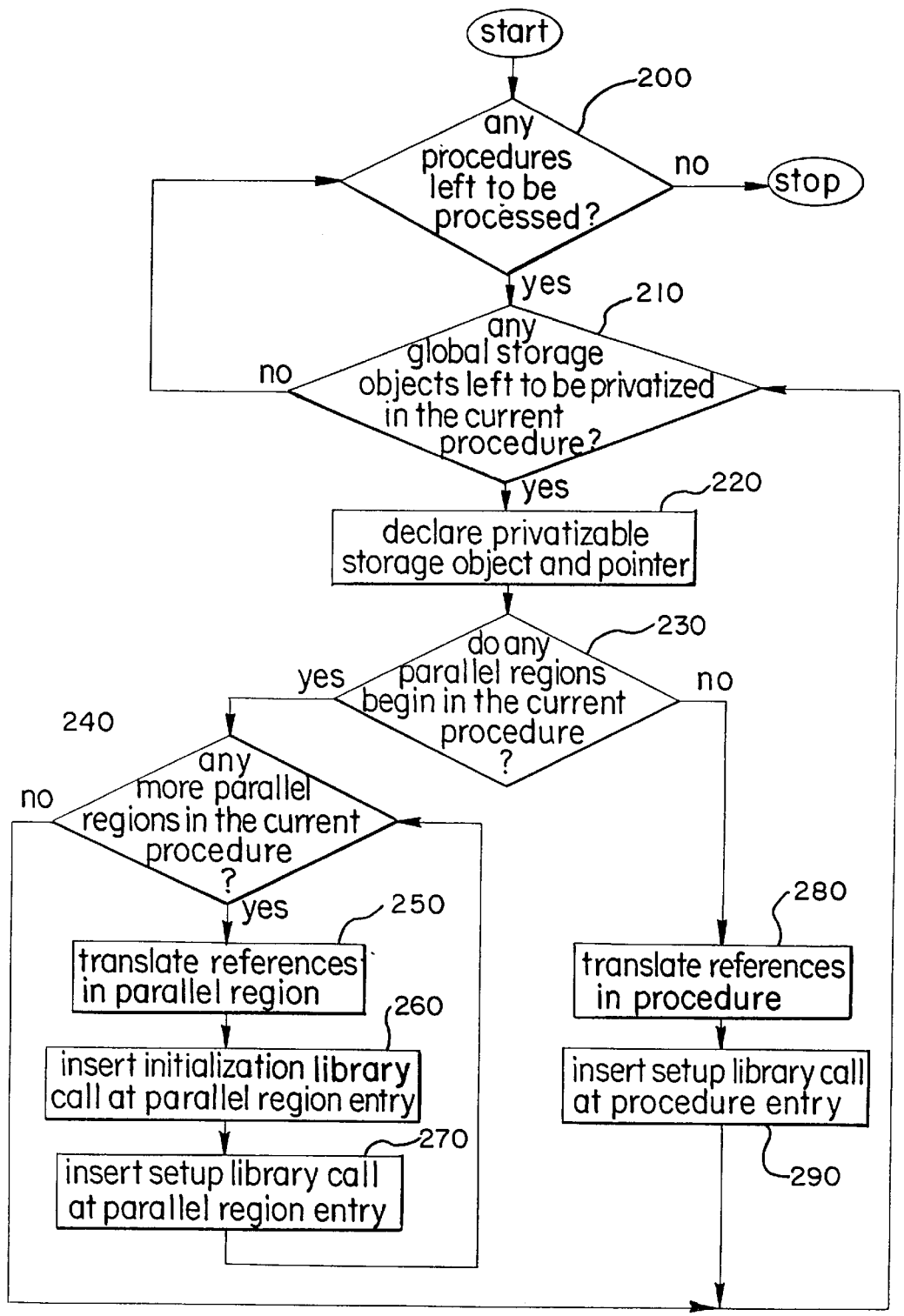
FIG. 2 is a flowchart of the primary algorithm for the translation means illustrated in FIG. 1.

FIG. 8A & B is an example of the basic mode of operation of the translation algorithm in FIG. 2.

FIG. 9A & B is an example of the operation of the algorithm in FIG. 2 for the case where aliases to members of a global storage object to be privatized are present.

FIG. 10A & B is an example of the operation of the algorithm in FIG. 2 for the case where a variable that must remain a simple storage object is to be privatized.

DESCRIPTION OF THE PREFERRED EMBODIMENT

Definitions and Assumptions

The preferred embodiment of the present invention takes as its input a parallel computer program, written in a common programming language, that comprises one or more procedures. Parallelism in the input program is expressed by designating parallel regions of execution that may be executed by one or more threads. Serial regions, between parallel regions, are executed by a single thread (referred to hereafter as the serial thread). The serial thread is also used for execution in parallel regions, so that it remains utilized between serial regions when it would otherwise remain idle. Typically, parallel regions execute different threads on different physical processors in a parallel computer system, with one thread per processor; however, multiple threads may execute on a single processor, or vice-versa. As a consequence of this general thread-based model of parallel execution, the preferred embodiment privatizes global storage objects by providing a separate, private copy of each object for each thread, as opposed to each processor.

The preferred embodiment supports both static and dynamic privatization of global storage objects. Static privatization is implemented by assuming Cray TASK COMMON semantics. In static privatization, a global storage object is privatized in all parallel regions in which it occurs. Given this fact, and since the serial thread executes in parallel regions as well, only N-1 private copies of a global object are required in an N-thread parallel environment; the global copy is used by the serial thread in both serial and parallel regions. These semantics result in implicit copy-in from the global object to one thread's (i.e., the serial thread's) private copy of the object at the beginning of each parallel region, and implicit copy-out to the global object from the serial thread's "private" copy at the end of each parallel region. Explicit, on-demand copy-in (to all threads executing a particular parallel region, at the beginning of that parallel region) or copy-out (from some thread executing a particular parallel region, at the end of that parallel region) can also be supported.

Dynamic privatization is implemented by assuming ANSI X3H5 draft semantics. In dynamic privatization, a global storage object can be privatized or be accessed globally, in a shared manner, in any particular parallel region. To support this capability, N private copies of the global object are used in an N-thread parallel environment. The global object is accessed by the serial thread in serial regions, and by all threads in any parallel regions where the object is not privatized; the N private copies are used in any parallel regions where the object is privatized. Explicit, on-demand copy-in (from the global object to the private copies) or copy-out (from one of the private copies to the global object) can be supported. While a basic dynamic privatization scheme can be implemented by using only N-1 private copies, N private copies are required to implement ANSI X3H5 draft copy-in and copy-out semantics.

The preferred embodiment of the present invention defers the allocation and initialization of privatized storage for a global storage object until this privatized storage is actually needed. In the case of static privatization, allocation and initialization of the privatized storage occurs at the beginning of the first parallel region in the first procedure that declares the privatized object; the object remains privatized in all parallel regions thereafter. In the dynamic case, allocation and initialization occur at the beginning of the first parallel region in which the object is to be privatized; the private storage is used (only) in subsequent parallel regions wherein the object is to be privatized, and is not de-allocated and re-allocated for use in subsequent parallel regions. Initialization is performed at the time of allocation by copying from the global object to each private copy. Subsequent re-initialization of private copies from the global object is supported via an explicit copy-in mechanism that can be used at the beginning of each particular parallel region.

To facilitate the description of the structure and operation of the preferred embodiment, it is assumed, for purposes of this description, that the input parallel computer program is written in the Fortran 77 programming language. Given this assumption, the description concerns itself with the privatization of Fortran COMMON blocks, which are the primary type of privatizable global storage objects in Fortran. The availability of several common extensions to Fortran 77 is assumed, including:

1. the capability to take the address of a variable (using the LOC intrinsic function or some similar means), which is used to determine addresses of storage objects,
2. Digital Equipment Corporation (DEC) VAX Fortran extensions for STRUCTUREs, RECORDs, UNIONs, and MAPs, which are used to construct and encapsulate compound storage objects, and
3. Cray Research, Inc. Fortran extensions for POINTER variables, which are used to store addresses of storage objects.

It is further assumed that parallelism and privatization requirements are specified by using Kuck and Associates, Inc. (KAI) KAP/Pro Parallel Directives (which are based on ANSI X3H5 draft directives) embedded in the input parallel computer program. In particular, the availability of the following particular directives is assumed:

1. C$PAR PARALLEL, which delimits the beginning of a parallel region from a preceding serial or parallel region,
2. C$PAR END PARALLEL, which indicates the end of a parallel region whose beginning was indicated with a C$PAR PARALLEL directive,
3. C$PAR INSTANCE TASK/name/, which indicates that the named global storage object should be statically privatized,
4. C$PAR INSTANCE PARALLEL/name/, which indicates that the named global storage object should be dynamically privatized,
5. C$PAR NEW/name/, which, when associated with a C$PAR PARALLEL directive, indicates that the named dynamically privatizable global storage object should be privatized in that parallel region (the C$PAR NEW directive is superfluous for statically privatizable objects), and
6. C$PAR COPY NEW/name/, which, when associated with a C$PAR PARALLEL directive, indicates that all privatized copies of the named statically or dynamically privatizable global storage object should be copied into at the beginning of that parallel region (and, for a dynamically privatizable global storage object, that this object should be privatized in that parallel region).

Since the description of the preferred embodiment concerns itself with the privatization of Fortran COMMON blocks, a /name/ specified in one of the aforementioned directives is assumed to be the name of a Fortran COMMON block.

Structure and Operation

Figure 1:
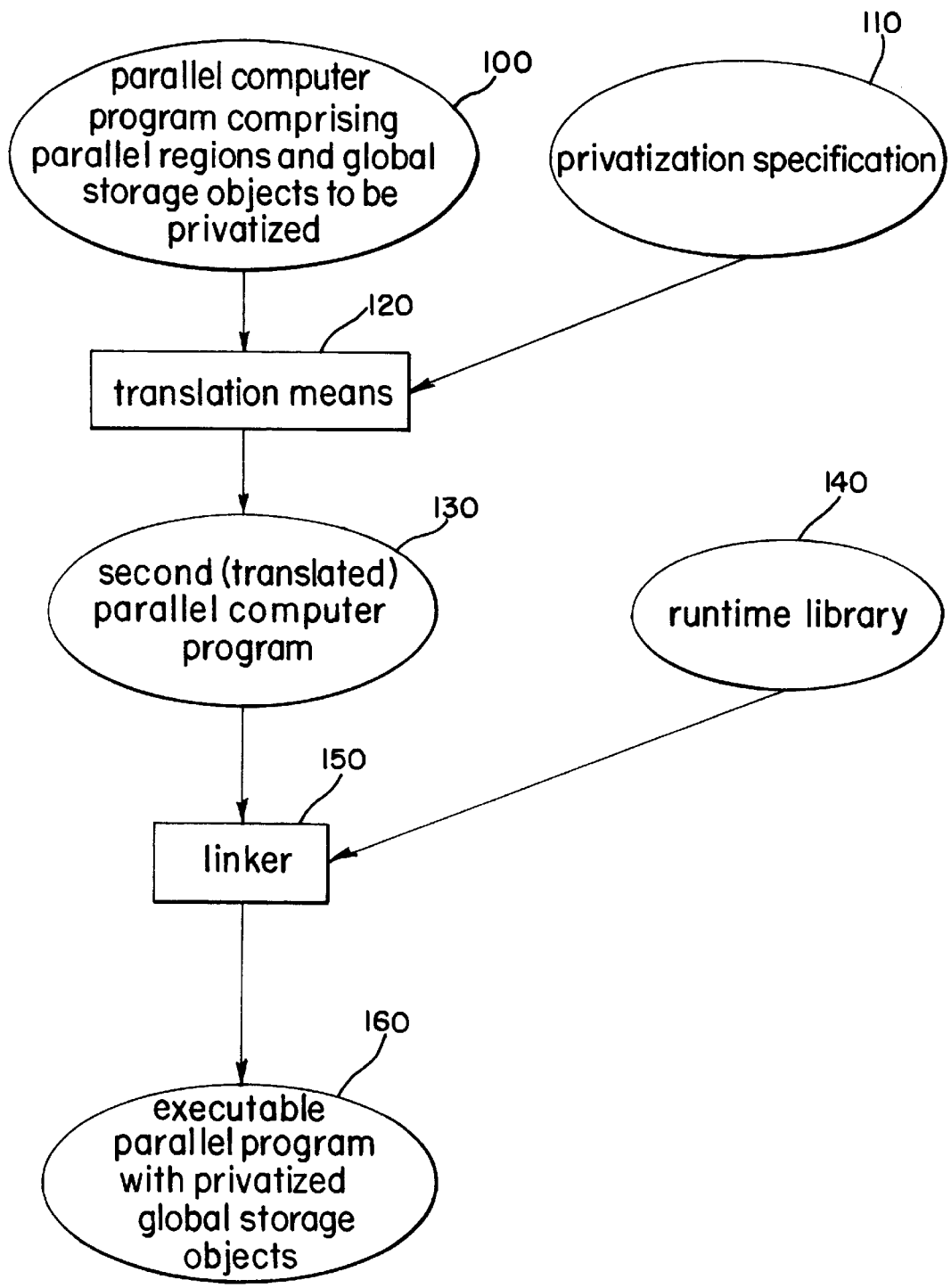
FIG. 1 illustrates the overall structure of the present invention.

FIG. 1 illustrates the overall structure of the present invention. The inputs are a parallel computer program 100, comprising parallel regions and global storage objects, and a privatization specification 110 describing the global storage objects to be privatized. Program 100 is augmented via a translation means 120, according to privatization specification 110, to produce a translated parallel computer program 130. In the preferred embodiment, translation means 120 performs a source-to-source transformation of program 100 into translated program 130, and is implemented by a general purpose computer having a memory and operating under the control of a computer program. Translated program 130 is linked with a runtime support library 140 by a general purpose computer's linker 150 to produce an executable parallel computer program 160. Executable program 160, when executed, accesses the global storage objects specified in privatization specification 110 in a privatized manner.

FIG. 2 is a flowchart of the algorithm performed by translation means 120. The inputs to the algorithm are program 100 and privatization specification 110; the output is translated program 130. Privatization specification 110 comprises KAP/Pro Parallel Directives embedded in program 100. Step 200 determines if there are any more procedures left to be processed in program 100. If not, the algorithm is complete; otherwise, the next procedure is processed beginning at step 210. Step 210 determines if there are any more global storage objects to be privatized in the current procedure. If not, further procedures are considered at step 200; otherwise, the next global storage object in the current procedure is privatized beginning at step 220. Step 220 declares a privatizable storage object (i.e., a structure), which encapsulates the current global storage object, and declares a pointer to that structure.

Step 230 determines if any parallel regions begin in the current procedure. If so, each of these parallel regions is considered in turn beginning at step 240. Step 240 determines if there are any more parallel regions left to consider in the current procedure. If not, further global storage objects in the current procedure are considered at step 210;

otherwise, the next parallel region in the current procedure is processed beginning at step 250. Step 250 translates the references to the current global storage object, throughout the current parallel region, into references to the structure declared in step 220. Next, step 260 inserts a library call, to initialize library data structures for the current parallel region, at the beginning of the parallel region. Next, step 270 inserts a library call, to initialize the pointer declared in step 220 to point to the appropriate thread-private memory for the current global storage object, at the beginning of the current parallel region (after the initialization library call inserted in step 260). If no parallel regions begin in the current procedure, step 280 translates the references to the current global storage object, throughout the current procedure, into references to the structure declared in step 220. Next, step 290 inserts a library call, to initialize the pointer declared in step 220 to point to the appropriate thread-private memory for the current global storage object, at the beginning of the current procedure.

Figure 3:
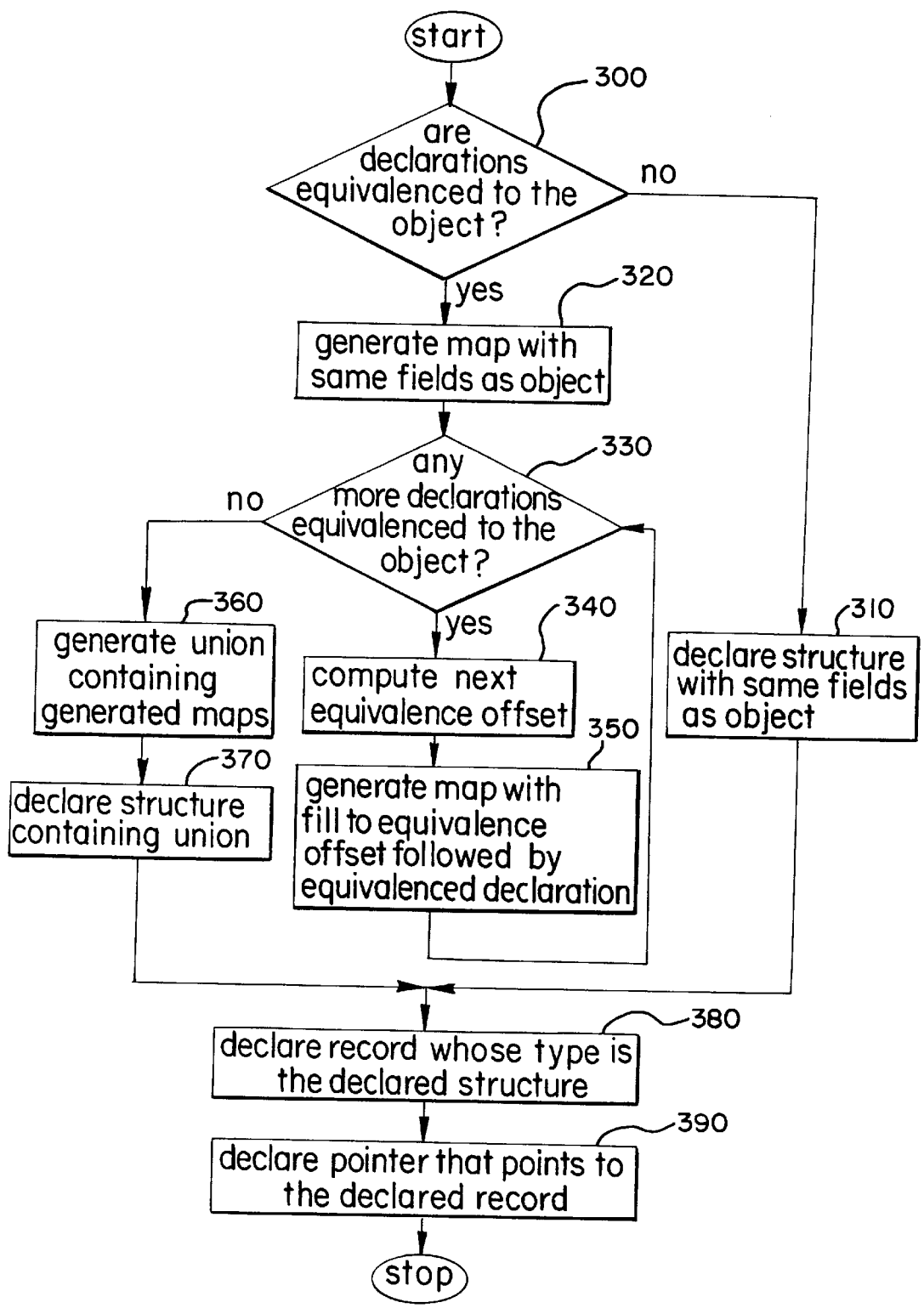
FIG. 3 is a flowchart of the algorithm that implements the step in FIG. 2 that declares a privatizable storage object and pointer.

Declaration of privatizable objects (step 220): FIG. 3 is a flowchart of the algorithm that implements step 220. Step 300 determines if any objects declared in the current procedure are aliased, through Fortran EQUIVALENCE statements, to members of a COMMON block to be privatized. If not, step 310 declares a STRUCTURE with fields corresponding (i.e., in name, type, and order) to the members of the COMMON block; otherwise, the EQUIVALENCEs are handled beginning at step 320. Step 320 generates a MAP with fields corresponding to the members of the COMMON block, and subsequent MAPs are generated, beginning at step 330, for each object EQUIVALENCEd to a member of the COMMON block. Step 330 determines if there are any objects remaining to be considered that are EQUIVALENCEd to members of the COMMON block; if so, step 340 computes the offset into the COMMON member corresponding to the EQUIVALENCEd object, and step 350 generates a MAP containing a % FILL declaration corresponding to this equivalence offset, followed by a declaration of the EQUIVALENCEd object itself. When step 330 determines that all objects EQUIVALENCEd to members of the COMMON block have been considered, step 360 generates a UNION containing the MAPs generated in steps 320 and 350. Step 370 then declares a STRUCTURE containing the UNION generated in step 360. After a STRUCTURE is declared by one of steps 310 or 370, step 380 declares a RECORD whose type is the declared STRUCTURE, and step 390 declares a POINTER to point to the RECORD declared in step 380.

Translation of references (steps 250, 280): Steps 250 and 280 translate references to members of a COMMON block to be privatized into references to the corresponding fields of a RECORD declared in step 220 (step 380). While step 280 translates all the references to members of the COMMON block in the current procedure, step 250 translates only those references that are within the current parallel region. References to objects that are EQUIVALENCEd to members of the COMMON block are also translated into the corresponding members of the MAPs (step 350) in the RECORD. For cases where Fortran syntax requires a scalar variable, rather than a RECORD field reference, a temporary local variable must be introduced whose value is copied into and out of the corresponding RECORD field.

Insertion of library calls (steps 260, 270, 290): A library call inserted in steps 270 or 290 takes as its inputs the address of a global storage object to be privatized, the size (in bytes) of that object, a privatization_type parameter that indicates whether static (C$PAR INSTANCE TASK) or dynamic (C$PAR INSTANCE PARALLEL) has been requested for that object, and a mode_type parameter that indicates whether dynamic privatization (C$PAR NEW) or explicit copy-in (C$PAR COPY NEW) has been requested for that object (for the current parallel region). The call allocates and initializes privatized storage for the object according to the requested semantics and initializes the pointer declared in step 220 to the base of the appropriate privatized storage. A library call inserted in step 270 is inserted before the first executable statement of a parallel region. A library call inserted in step 290 is inserted before the first executable statement of a procedure; if the procedure has multiple entry points, a copy of the call is inserted before the first executable statement at each entry point.

A library call inserted in step 260 has no parameters. The call performs library data structure initializations that are required at the beginning of each parallel region. A call inserted in step 260 is inserted before the first executable statement of a parallel region.

Figure 4:
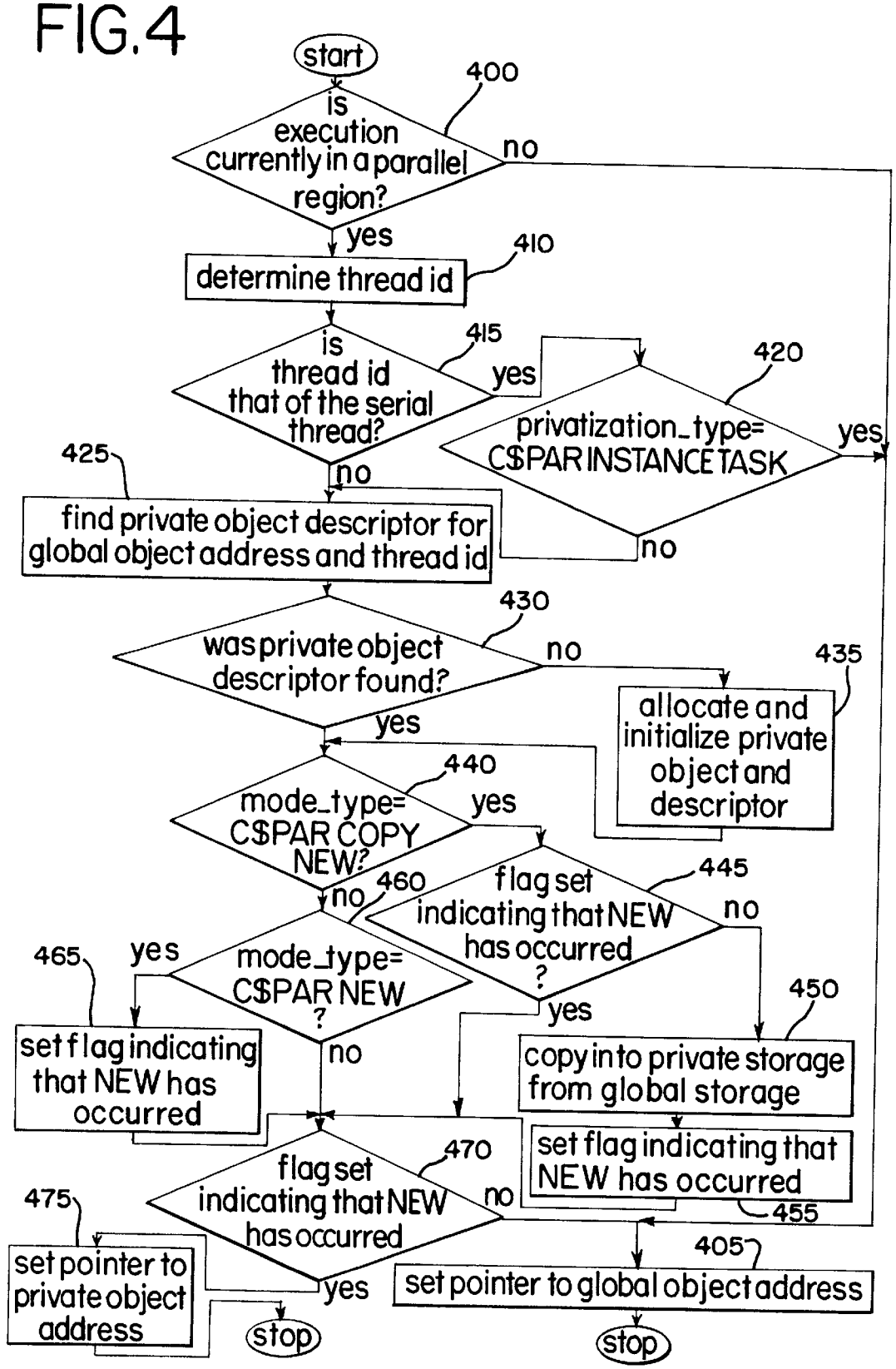
FIG. 4 is a flowchart of the algorithm that is performed when a setup library call, inserted by one of two steps in FIG. 2, is executed by a particular thread in a translated parallel computer program.

Setup library routine: FIG. 4 is a flowchart of the algorithm that is performed when a library call inserted in step 270 or 290 is executed by a particular thread in executable program 160. Step 400 checks to see if the current thread is executing in a parallel region, as opposed to a serial region. If in a serial region, no privatized storage is used, and the pointer declared in step 220 is set to the address of the global storage object (step 405). If in a parallel region, step 410 determines the thread id of the current thread. In the preferred embodiment, thread ids are represented by consecutive, non-negative integers. Step 415 determines if this thread id is that of the serial thread; if so, and the privatization_type input to this library call is C$PAR INSTANCE TASK, indicating static privatization (step 420), then the serial thread's storage is used, and the returned pointer value is the address of the global storage object (step 405). Steps 415 and 420 implement the N-1 private copy semantics of C$PAR INSTANCE TASK. Otherwise, step 425 attempts to locate a private object descriptor, in a library data structure, that describes the thread-private storage for the global storage object in the current thread. Step 430 tests the result of step 425 to determine if private storage has previously been allocated for this global storage object and thread id. If not, step 435 allocates and initializes this private storage.

The mode_type input to the library call is handled beginning at step 440. If the mode_type is C$PAR COPY NEW (step 440) and the private object descriptor (step 425) indicates that NEW has not occurred (step 445), then the private storage is copied into from the global storage object (step 450) and the private object descriptor is updated to indicate that NEW has occurred (step 455). Otherwise, if the mode_type is C$PAR NEW (step 460), the private object descriptor is updated to indicate that NEW has occurred (step 465). Finally, step 470 determines the returned pointer value. If the private object descriptor indicates that new has occurred, then the returned pointer value is the address of the private storage from the private object descriptor (step 475); otherwise, no privatized storage is used, and the returned pointer value is the address of the global storage object (step 405). At this point, the algorithm is complete.

Figure 5:
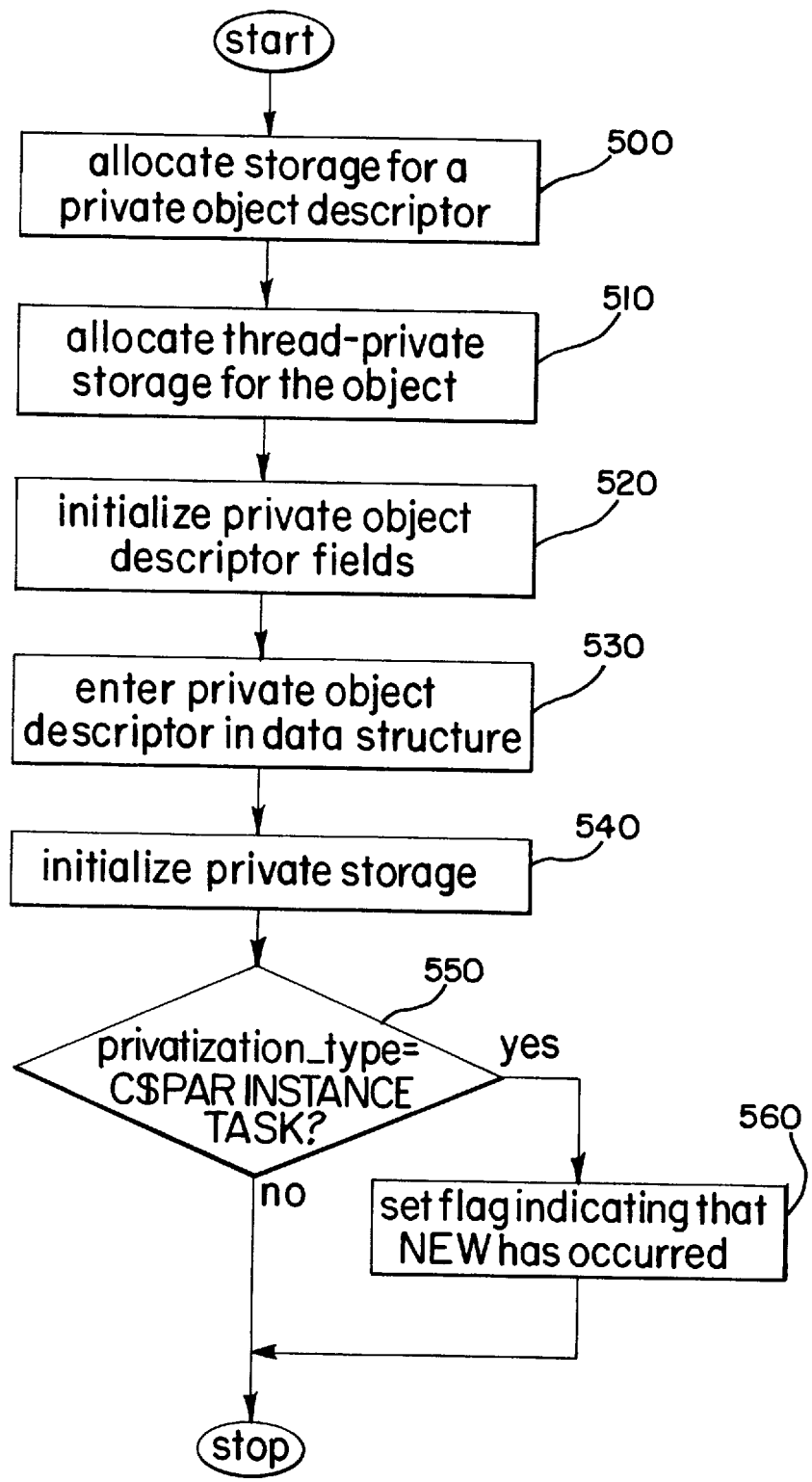
FIG. 5 is a flowchart of the algorithm that implements the step in FIG. 4 that allocates and initializes a private object and descriptor.

FIG. 5 is a flowchart of the algorithm that implements step 435. Step 500 allocates storage in global memory for a new private object descriptor that will hold information about this particular piece of privatized storage for the current thread id. Step 510 allocates thread-private storage for the object and the current thread id with the same size, in bytes, as the global storage object. Step 520 initializes the private object descriptor allocated in step 500 with the address of the storage allocated in step 510 and the privatization_type input to the library call; the flag in the descriptor is initialized to indicate that NEW has not yet occurred. Step 530 makes an entry in a library data structure so that the new private object descriptor can be located in step 425. Step 540 initializes the private storage allocated in step 510 by copying from the global storage object. Step 550 handles static privatization semantics; if the privatization_type input to the library call is C$PAR INSTANCE TASK, then step 560 updates the private object descriptor to indicate that NEW has occurred. At this point, the algorithm is complete.

Figure 6:
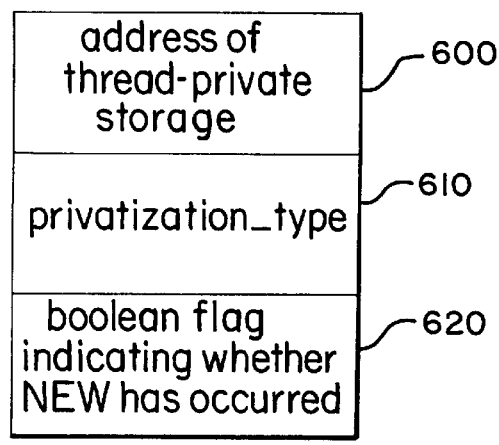
FIG. 6 illustrates the contents of a private object descriptor.

Library data structures: FIG. 6 illustrates the contents of a private object descriptor, as used in steps 425, 435, 445, 455, 465–475, and 500–560. Each private object descriptor is a record comprising three fields: an address 600 of an area of thread-private storage for a particular global storage object and a particular thread id, a copy of the privatization_type input to the library call (FIG. 4) indicating whether address 600 is to be statically or dynamically privatized, and a boolean flag 620 indicating whether NEW has dynamically occurred (i.e., C$PAR NEW or C$PAR COPY NEW), since the most recent beginning of a parallel region, during the execution of executable program 160. Address 600 is used in steps 475, 520, and 540 to reference the privatized storage associated with a private object descriptor. Privatization type 610 is set in step 520 and is used in step 550. Flag 620 is tested or set in steps 445, 455, 465, 470, 520, and 560 to track whether NEW has occurred.

Step 530 builds a library data structure to facilitate finding private object descriptors (FIG. 6) for particular global storage objects and particular thread ids in step 425. In the preferred embodiment, these functions are implemented via associative mappings. In particular, an array of hash tables in global memory, one per thread id, is used to map global storage object addresses to private object descriptor addresses for each thread id. Equivalently, rather than an array of hash tables, single hash tables could be stored in thread-private memory, and step 500 could allocate private object descriptors in private, rather than global, memory.

Figure 7:
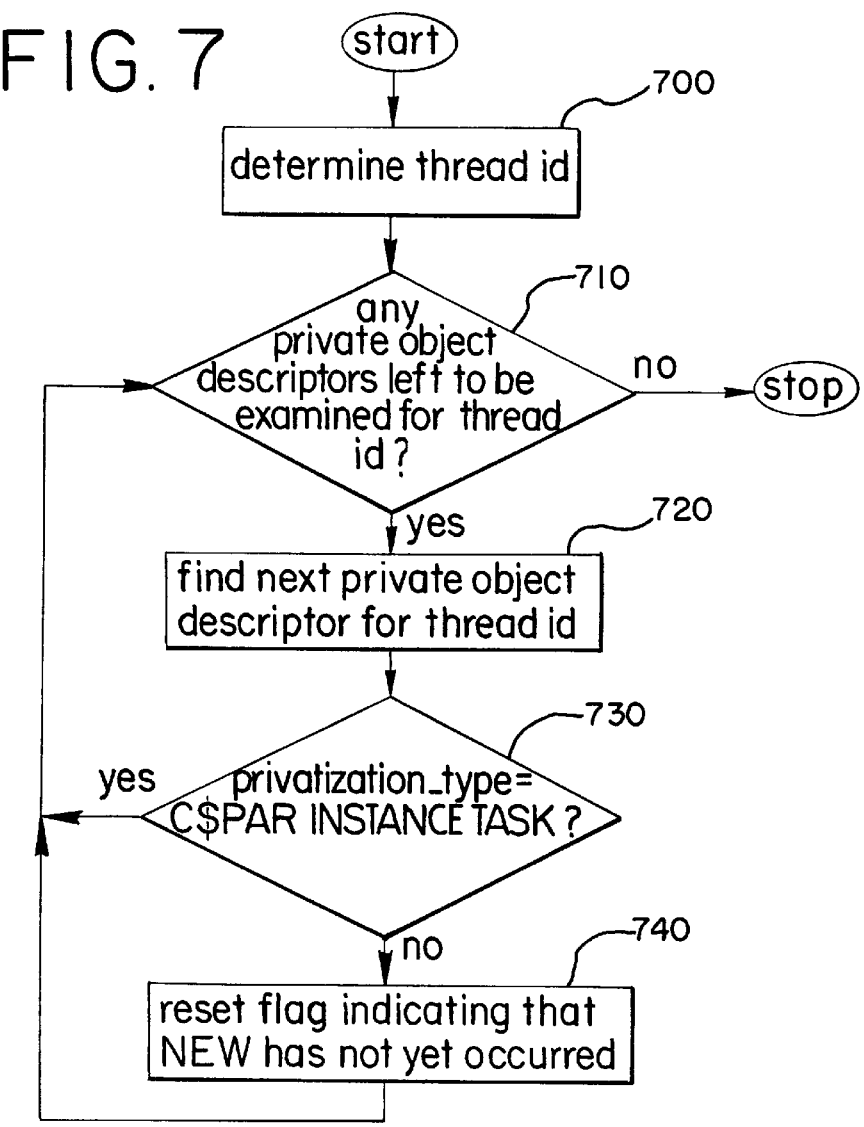
FIG. 7 is a flowchart of the algorithm that is performed when an initialization library call, inserted by a step in FIG. 2, is executed by a particular thread, at the beginning of a parallel region, in a translated parallel computer program.

Initialization library routine: FIG. 7 is a flowchart of the algorithm that is performed when a library call inserted in step 260 is executed by a particular thread in executable program 160 at the beginning of a parallel region. For each thread, at the start of a parallel region, the algorithm resets flag 620 in each private object descriptor (FIG. 6) for which privatization_type 610 is C$PAR INSTANCE PARALLEL. This allows the algorithm in FIG. 4 to function correctly for dynamic privatization. Step 700 determines the thread id of the current thread. Step 710 determines if there are any private object descriptors left to be examined for the current thread. If not, the algorithm is complete; otherwise, step 720 retrieves the next private object descriptor for the current thread. If the privatization_type of this descriptor is not C$PAR INSTANCE TASK (step 730), flag 620 in that descriptor is reset to indicate that NEW has not yet occurred. Steps 700–720 require the ability to iterate over the set of private object descriptors, in the library data structure built by step 530, for a particular thread id.

Translation examples: FIG. 8 is an example of the basic mode of operation of translation means 120, using the algorithm in FIG. 2. FIG. 8a depicts a sample Fortran code fragment comprising a declaration of a COMMON block /tc/ that is to be statically privatized (C$PAR INSTANCE TASK), a parallel region delimited by C$PAR PARALLEL and C$PAR END PARALLEL, and references to the members of the COMMON block. FIG. 8b illustrates the results of applying translation means 120 to the code fragment of FIG. 8a. First (step 220), a STRUCTURE /s_tc/, which contains fields corresponding to the members of /tc/, is declared (step 310), along with a RECORD r_tc of type /s_tc/ (step 380), and a POINTER p_tc to RECORD r_tc (step 390). Next, the references to the members of /tc/ are translated to references to the corresponding fields of r_tc (step 250), and an initialization library call is inserted at the entry to the parallel region (step 260). Finally (step 270), a setup library call is inserted at the entry to the parallel region, after the initialization library call, to initialize p_tc to point to the appropriate privatized storage for /tc/. The parameters to the setup library call are the base address of /tc/ (taken from the base address of the first member of /tc/) the size of /tc/ (assuming eight bytes per real variable), the privatization_type (C$PAR INSTANCE TASK), and the mode_type (SETUP denotes no C$PAR NEW or C$PAR COPY NEW).

FIG. 9 is an example of the operation of translation means 120 in the presence of EQUIVALENCEs to members of the COMMON block to be privatized. FIG. 9a depicts a Fortran code fragment similar to that of FIG. 8a except that additional declarations exist for variables that are EQUIVALENCEd to members of COMMON block /tc/. FIG. 9b illustrates the results of applying translation means 120 to the code fragment of FIG. 9a. The results of translation are similar to those of FIG. 8b except with regard to the EQUIVALENCEd variables. In particular, step 220 generates a STRUCTURE containing a UNION of MAPs. Step 320 generates the first MAP with fields corresponding to the members of /tc/. Steps 340 and 350 generate the subsequent MAPs, one for each EQUIVALENCEd variable. Step 360 generates the UNION surrounding the MAPs, and step 370 declares STRUCTURE /s_tc/ containing the UNION. Step 250 translates the references to the EQUIVALENCEd variables to references to the corresponding fields of the MAPs in r_tc, in addition to performing normal translations for /tc/ as in FIG. 8b.

FIG. 10 is an example of the operation of translation means 120 when a DO loop index variable is a member of a COMMON block to be privatized. In this case, a temporary scalar variable must be introduced, since Fortran syntax requires that a DO loop index variable be a scalar, not a RECORD field reference. FIG. 10a depicts a Fortran code fragment similar to that of FIG. 8a. FIG. 10b illustrates the results of applying translation means 120 to the code fragment of FIG. 10a. The results of translation are similar to those of FIG. 8b except with regard to the loop index variable. In particular, step 250 introduces a temporary variable that is used as the DO loop index. Before the first executable statement inside the DO loop, step 250 copies the loop index value from the temporary variable back into the (translated) original index variable. This copying is required in case other code in the loop body needs to access the original index variable in the privatized COMMON block (e.g., if another procedure is called from the loop body that references the privatized COMMON block).

ALTERNATIVE EMBODIMENTS

There are several alternative embodiments of the present invention, based on the generality of the claimed structure of the invention. For instance, input program 100 can be written in any one of a number of different programming languages. In languages such as C and C++, for example, simple and compound global storage objects such as structs, unions, and classes may be privatized. In these languages, translation means 120 would employ structs and C pointers, analogous to how STRUCTUREs, RECORDs, and POINTERs are used in Fortran. In addition, privatization specification 110 need not be in the form of directives embedded in the input program. Alternative ways to specify privatization requirements include language extensions, library calls embedded in the input program, compiler or preprocessor command-line arguments, and auxiliary input files.

Another alternative embodiment would be to employ an alternative method for translation means 120 instead of the source-to-source translation method used in the preferred embodiment. Translation could be integrated with a compiler during the production of intermediate, assembly language, or object code. Translation could also be implemented at the intermediate, assembly language, or object code level. A disadvantage of these alternatives is the loss of portability resulting from the requirement that translation be tied to a particular compiler, architecture, or software environment. In addition, the latter translation methods may suffer from a decreased ability to perform high-level or interprocedural optimization of the translation method or of the translated code itself.

Yet another alternative embodiment would be to replace the library calls inserted in steps 260, 270, or 290 with partially or fully inlined code. This alternative may be more applicable in conjunction with the preceding lower-level translation alternatives. While partial or full inlining may yield some performance improvement, the disadvantages of this alternative include increased size of the translated code and increased complexity in the translation method.

Another class of alternative embodiments is based on employing translation means 120 to implement other privatization mechanisms described in the background of the invention; however, these embodiments would suffer from the corresponding disadvantages described in the background. One embodiment in this class would be to localize objects to be privatized and pass the localized objects down through procedure call chains. Localization could be accomplished by using mechanisms such as stack-allocated thread-private local variables or POSIX thread-local storage. For Fortran COMMON blocks, privatization would have to be performed at the level of individual COMMON block members. One significant disadvantage of this approach, with respect to Fortran COMMON blocks, is that the relationships that hold between members of a COMMON block (e.g., EQUIVALENCEs) may not hold between the privatized members of that COMMON block. This is due to the fact that only individual COMMON members can be privatized when using this method, since COMMON blocks are not addressable by name. Another disadvantage of this approach is that interprocedural or whole-program analysis is needed in order to properly modify procedure call chains.

Another alternative embodiment in this class would be to employ explicit expansion of objects to be privatized. Explicit expansion methods suffer from the disadvantage that an upper bound on the number of threads must be used to expand objects. Often, the number of threads varies, dynamically, from execution to execution of a parallel program; this variance can make even a bound on the number of threads difficult to determine, and poor storage utilization results when this upper bound exceeds the number of threads actually used. For Fortran COMMON blocks, explicit expansion is difficult when the sizes of a COMMON block declared in different procedures vary.

A third alternative embodiment in this class would be to expand individual members of objects to be privatized, or, in the case of Fortran COMMON blocks, individual COMMON block members. Expansion could be accomplished explicitly for each member or by allocating (expanded) arrays of pointers for each member to point to thread-private storage. This approach, like localizing and passing down through procedure call chains, suffers from the disadvantage that it does not preserve relationships between object members. For COMMON blocks, this disadvantage can also occur if a COMMON block is declared with different sizes or layouts in different procedures. In addition, explicit expansion suffers from the same disadvantages as the preceding alternative.

SUMMARY, RAMIFICATIONS, AND SCOPE

The present invention is a software-implemented method for privatizing global storage objects in parallel computer programs that is portable across various computer architectures and platforms. The portability of the privatization method is facilitated by the method's independence of such factors as: the features of a particular hardware architecture or configuration, operating system, compiler, linker, or thread environment; or the programming language used. The present invention supports as inputs a wide variety of common programming languages and methods for specifying the global storage objects to be privatized (and the manner and locations in which these objects are to be privatized), and does not require that input parallel computer programs be modified to change the way in which global storage objects to be privatized are addressed.

The present invention, as illustrated by the description of the preferred embodiment thereof, correctly and efficiently supports both static and dynamic privatization. While static privatization could be implemented by dynamically privatizing objects in all parallel regions, this latter approach suffers several disadvantages:

1. the semantics of implicit copy-in and copy-out for the serial thread in static privatization are not preserved;
2. thread-private storage is wasted since static privatization is implemented with N1 privatized copies of an object, in an N-thread parallel environment, whereas dynamic privatization is implemented with N privatized copies; and
3. execution time is wasted since objects that could have been statically privatized must be processed for each parallel region as though they were dynamically privatizable.

Further objects and advantages of the present invention, as illustrated by the description of the preferred embodiment thereof, include independence of the number, or range of numbers, of threads used; the ability to privatize both simple and compound global storage objects; the ability to privatize compound global storage objects while preserving the relationships that hold between members of those objects; and the ability to perform privatization while supporting separate compilation. Independence of the number of threads is achieved by employing dynamic, on-the-fly allocation and initialization of privatized storage by each individual thread in parallel regions, and by avoiding techniques such as explicit expansion. Preserving relationships between members of compound privatized objects facilitates the privatization of compound objects such as Fortran COMMON blocks, and preserves the functionality of many common programing techniques that exploit aliasing, equivalencing, or indexing between object members. Privatization can be implemented while supporting separate compilation, without mandating interprocedural or whole-program analysis, because the method processes each procedure independently, and because the method does not require parameter passing via procedure call chains.

While the preceding description contains many specificities, these should not be construed as limitations on the scope of the invention, but rather as an exemplification of one preferred embodiment thereof. For example, the present invention should not be construed as being restricted to source-to-source program transformation methods, or to transformation methods employing the insertion of calls to library routines. Many variations will become apparent to those skilled in the art from the preceding description and accompanying drawings. Accordingly, the scope of the invention should be determined not by the embodiments illustrated, but by the appended claims and their legal equivalents.

What is claimed is:

1. A method for translating, in a computer storage medium, a parallel computer program into a second parallel computer program according to a privatization specification, said parallel computer program comprising one or more parallel regions and one or more global storage objects to be privatized according to said privatization specification, said second parallel computer program comprising said parallel regions and having the ability, when executed, to access privatized copies of said global storage objects according to said privatization specification, said privatization specification indicating the said global storage objects to be privatized and the said parallel regions of said parallel computer program in which the privatization of said global storage objects is to occur, each of said global storage objects being stored in a computer storage medium and having the ability to be accessed in a shared manner by multiple threads of execution, each of said privatized global storage objects being stored in a computer storage medium and having the ability to be accessed in a private manner by each of said threads as opposed to each processor, said method comprising the steps of:

a. providing, in said second parallel computer program, for a particular said global storage object, a means for addressing privatized copies of said particular global storage object;
   b. addressing, in said second parallel computer program, said privatized copies of said particular global storage object, rather than said particular global storage object, by using said addressing means;
   c. providing a means for instantiating, when said second parallel computer program is executed, said privatized copies of said particular global storage object according to said privatization specification, said privatized copies being addressable by using said addressing means; and
   d. repeating steps (a), (b), and (c) for each of said global storage objects to be privatized.

2. The method of claim 1 wherein said method comprises the steps of:

a. inserting, in said second parallel computer program, for a particular said global storage object, a declaration of a privatizable storage object corresponding to said particular global storage object;
   b. translating, in said second parallel computer program, each of the references to said particular global storage object into references to said privatizable storage object;
   c. inserting, in said second parallel computer program, setup machine instructions, said setup machine instructions providing a means for instantiating, when said second parallel computer program is executed, said privatizable storage object according to said privatization specification; and
   d. repeating steps (a), (b), and (c) for each of said global storage objects to be privatized.

3. The method of claim 2 wherein said instantiating means comprises, for each of said threads executed in said second parallel computer program, the steps of:

a. determining the current thread id, said current thread id being that of the particular one of said threads that is currently executing said instantiating means;
   b. determining whether one of said privatized copies of said particular global storage object was previously allocated, said one of said privatized copies corresponding to said current thread id;
   c. if said one of said privatized copies was not previously allocated, allocating and initializing said one of said privatized copies, said one of said privatized copies being allocated in a computer storage medium;
   d. if said privatization specification specifies that copy-in initialization is to be performed for said particular global storage object, copying from said particular global storage object to said one of said privatized copies;
   e. if said privatization specification specifies dynamic privatization for said particular global storage object and said privatization specification specifies that privatization of said particular global storage object is to occur in a particular one of said parallel regions, performing, in said one of said parallel regions, said references to said privatizable storage object by using, as the base address of said privatizable storage object in said one of said parallel regions, the address of said one of said privatized copies;
   f. if said privatization specification specifies dynamic privatization for said particular global storage object and said privatization specification does not specify that privatization of said particular global storage object is to occur in a particular one of said parallel regions, performing, in said one of said parallel regions, said references to said privatizable storage object by using, as the base address of said privatizable storage object in said one of said parallel regions, the address of said particular global storage object;
   g. if said privatization specification specifies static privatization for said particular global storage object and said current thread id is the thread id of the particular one of said threads that is used to execute serial code between said parallel regions, performing said references to said privatizable storage object by using, as the base address of said privatizable storage object, the address of said particular global storage object; and
   h. if said privatization specification specifies static privatization for said particular global storage object and said current thread id is not the thread id of the particular one of said threads that is used to execute serial code between said parallel regions, performing said references to said privatizable storage object by using, as the base address of said privatizable storage object, the address of said one of said privatized copies.

4. The method of claim 3 wherein said allocating and initializing said one of said privatized copies comprises copying from said particular global storage object to said one of said privatized copies.

5. The method of claim 3 wherein said determining whether one of said privatized copies of said particular global storage object was previously allocated comprises determining the existence of a private object descriptor, said private object descriptor being stored in a computer storage medium, said private object descriptor corresponding both to said particular global storage object and to said current thread id, said private object descriptor uniquely identifying said one of said privatized copies.

6. The method of claim 5 wherein said allocating and initializing said one of said privatized copies further comprises allocating and initializing said private object descriptor, said private object descriptor being allocated in a computer storage medium.

7. The method of claim 6 wherein said allocating and initializing said one of said privatized copies comprises copying from said particular global storage object to said one of said privatized copies.

8. The method of claim 3 wherein said instantiating means is provided by a library procedure, said library procedure comprising library machine instructions, said steps of said instantiating means being implemented by said library machine instructions, said library procedure being linked for execution with said second parallel computer program, said setup machine instructions comprising calls to said library procedure, said calls to said library procedure causing, when said second parallel computer program is executed, said library machine instructions to be executed, each of said calls to said library procedure comprising arguments and a return values, said arguments comprising the address of said particular global storage object, said return values comprising the address of said privatizable storage object, said address of said privatizable storage object being used to implement said references to said privatizable storage object.

9. The method of claim 8 wherein said allocating and initializing said one of said privatized copies comprises copying from said particular global storage object to said one of said privatized copies.

10. The method of claim 8 wherein said determining whether one of said privatized copies of said particular global storage object was previously allocated comprises determining the existence of a private object descriptor, said private object descriptor being stored in a computer storage medium, said private object descriptor corresponding both to said particular global storage object and to said current thread id, said private object descriptor uniquely identifying said one of said privatized copies.

11. The method of claim 10 wherein said allocating and initializing said one of said privatized copies further comprises allocating and initializing said private object descriptor, said private object descriptor being allocated in a computer storage medium.

12. The method of claim 11 wherein said allocating and initializing said one of said privatized copies comprises copying from said particular global storage object to said one of said privatized copies.

\* \* \* \* \*